(12) United States Patent
O'Boyle et al.

(10) Patent No.: US 11,092,387 B2
(45) Date of Patent: Aug. 17, 2021

(54) HEAT TRANSFER ASSEMBLY FOR ROTARY REGENERATIVE PREHEATER

(71) Applicant: Arvos Ljungstrom LLC, Wellsville, NY (US)

(72) Inventors: Kevin J. O'Boyle, Alma, NY (US); James D. Seebald, Wellsville, NY (US); Jeffery E. Yowell, Portville, NY (US)

(73) Assignee: Arvos Ljungstrom LLC, Wellsville, NY (US)

( * ) Notice: Subject to any disclaimer, the term of this patent is extended or adjusted under 35 U.S.C. 154(b) by 0 days.

(21) Appl. No.: 16/452,954

(22) Filed: Jun. 26, 2019

(65) Prior Publication Data

US 2019/0383562 A1 Dec. 19, 2019

Related U.S. Application Data

(60) Continuation of application No. 14/922,592, filed on Oct. 26, 2015, now Pat. No. 10,378,829, which is a
(Continued)

(51) Int. Cl.
| | |
|---|---|
| *F28D 19/04* | (2006.01) |
| *F28F 3/02* | (2006.01) |
| *F28F 3/08* | (2006.01) |

(52) U.S. Cl.
CPC ......... *F28D 19/042* (2013.01); *F28D 19/044* (2013.01); *F28D 19/041* (2013.01);
(Continued)

(58) Field of Classification Search
CPC ...... F28D 19/042; F28D 19/044; F28F 3/025; F28F 3/08; Y10T 29/49357
See application file for complete search history.

(56) References Cited

U.S. PATENT DOCUMENTS

| | | |
|---|---|---|
| 682,607 A | 9/1901 | Eck |
| 1,429,149 A | 9/1922 | Lawrence |
| | (Continued) | |

FOREIGN PATENT DOCUMENTS

| | | |
|---|---|---|
| CA | 1061653 A | 9/1979 |
| CA | 2759895 A1 | 11/2010 |
| | (Continued) | |

OTHER PUBLICATIONS

English Translation of Reason for Refusal for Japanese Patent Application No. 2012-509814, dated Feb. 24, 2014, pp. 1-7.
(Continued)

*Primary Examiner* — Devon Russell
(74) *Attorney, Agent, or Firm* — Murtha Cullina LLP

(57) ABSTRACT

Disclosed is a heat transfer assembly for a rotary regenerative preheater. The heat transfer assembly includes a plurality of heat transfer elements stacked in spaced relationship to each other in a manner such that each notch from a plurality of notches of one of the heat transfer element rests on respective flat sections from a plurality of flat sections of the adjacent heat transfer elements to configure a plurality of closed channels, each isolated from the other, wherein each of the channels has a configuration in a manner such that each of corrugation sections from a plurality of corrugation sections of one of the heat transfer elements faces respective undulation sections from a plurality of undulation sections of the adjacent heat transfer elements.

11 Claims, 5 Drawing Sheets

Figure 1:
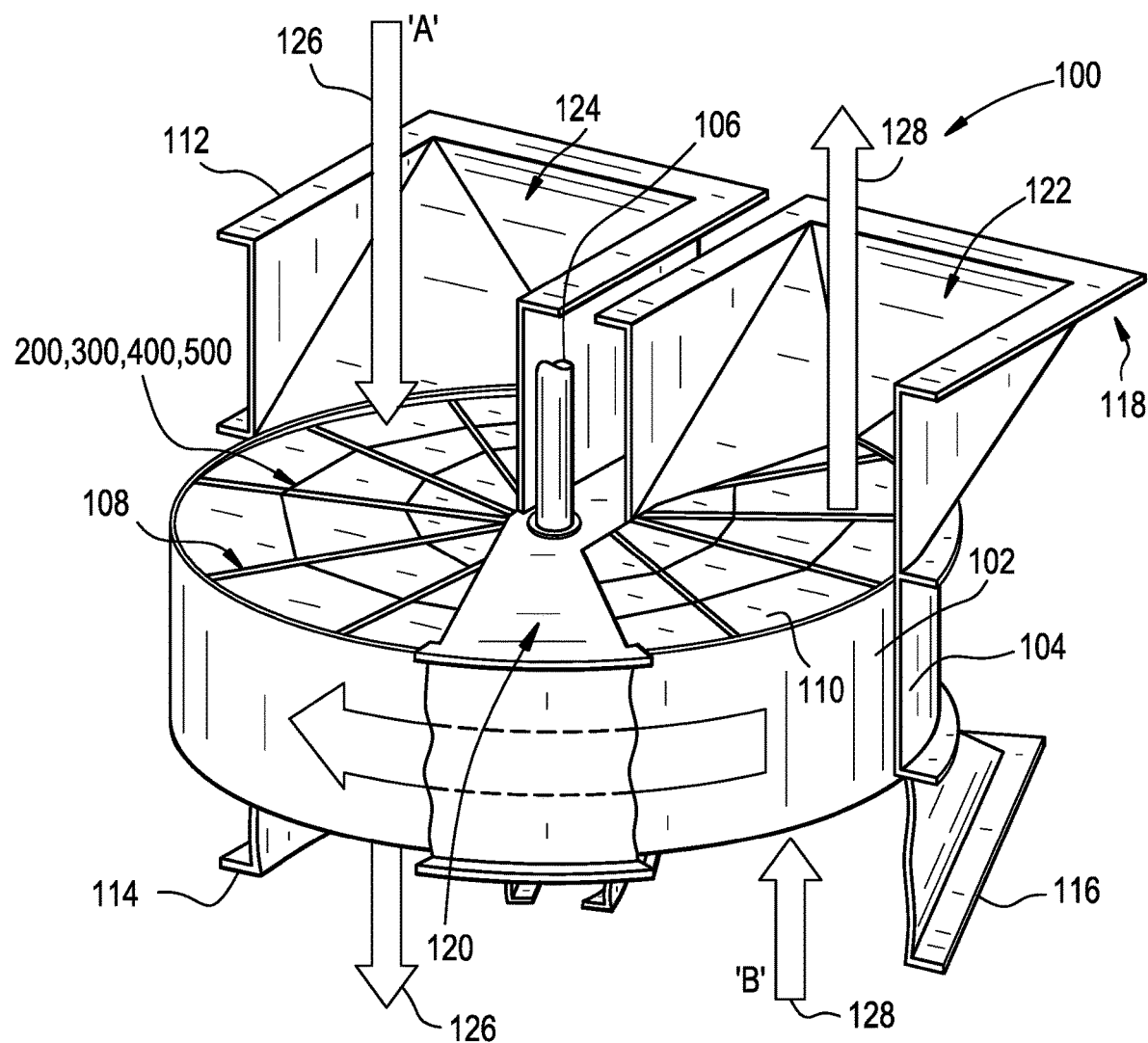

Related U.S. Application Data division of application No. 13/593,054, filed on Aug. 23, 2012, now Pat. No. 9,200,853.

(52) U.S. Cl.
CPC .............. F28F 3/025 (2013.01); F28F 3/08 (2013.01); Y10T 29/49357 (2015.01)

(56) References Cited

U.S. PATENT DOCUMENTS

| | | |
|---|---|---|
| 1,450,351 A | 4/1923 | Beran |
| 1,875,188 A | 4/1923 | Beran |
| 1,477,209 A | 12/1923 | Cowan |
| 1,524,280 A | 1/1925 | Bancel |
| 1,894,956 A | 1/1933 | Kerr |
| 1,915,742 A | 6/1933 | Mautsch |
| 1,987,798 A | 1/1935 | Ruppricht |
| 2,042,017 A | 5/1936 | Orchard |
| 2,102,936 A | 12/1937 | Bailey |
| 2,160,677 A | 5/1939 | Romanoff |
| 2,313,081 A | 3/1943 | Ljungstrom |
| 2,432,198 A | 12/1947 | Karlsson et al. |
| 2,596,642 A | 5/1952 | Boestad |
| 2,782,009 A | 2/1957 | Rippingille |
| 2,796,157 A | 6/1957 | Ginsburg |
| 2,940,736 A | 6/1960 | Odman |
| 2,983,486 A | 5/1961 | Rosenberg |
| 3,019,160 A | 1/1962 | Slezak et al. |
| 3,111,982 A | 11/1963 | Ulbricht |
| 3,158,527 A | 11/1964 | Faccin et al. |
| 3,183,963 A | 5/1965 | Mondt |
| 3,216,494 A | 11/1965 | Goodman |
| 3,240,266 A | 3/1966 | Corbet et al. |
| 3,260,511 A | 7/1966 | Greer |
| 3,262,490 A | 7/1966 | Olson |
| 3,317,222 A | 5/1967 | Maretzo |
| 3,372,743 A | 3/1968 | Pall et al. |
| 3,373,798 A | 3/1968 | Brummett |
| 3,415,502 A | 12/1968 | Munters |
| 3,452,814 A | 7/1969 | Malewicz |
| 3,490,523 A | 1/1970 | Esmond |
| 3,523,058 A | 8/1970 | Shick |
| 3,532,157 A | 10/1970 | Hubble |
| 3,540,529 A | 11/1970 | Umino et al. |
| 3,542,635 A | 11/1970 | Parker |
| 3,574,103 A | 4/1971 | Latkin |
| 3,674,620 A | 7/1972 | McCarthy et al. |
| 3,726,408 A | 4/1973 | Gewiss |
| 3,759,323 A | 9/1973 | Dawson et al. |
| 3,825,412 A | 7/1974 | Mullender |
| 3,830,684 A | 8/1974 | Hamon |
| 3,887,664 A | 6/1975 | Regehr |
| RE28,534 E | 8/1975 | Arne |
| 3,901,309 A | 8/1975 | Thebert |
| 3,940,966 A | 3/1976 | Deane |
| 3,941,185 A | 3/1976 | Henning |
| 3,952,077 A | 4/1976 | Wigley |
| 3,963,810 A | 6/1976 | Holmberg et al. |
| 4,034,135 A | 7/1977 | Passmore |
| 4,049,855 A | 9/1977 | Cogan |
| 4,098,722 A | 7/1978 | Cairns et al. |
| 4,125,149 A | 11/1978 | Kritzler et al. |
| 4,144,369 A | 3/1979 | Wass |
| 4,182,402 A | 1/1980 | Adrian |
| 4,202,449 A | 5/1980 | Bendt |
| 4,228,847 A | 10/1980 | Lindahl |
| 4,296,050 A | 10/1981 | Meier |
| 4,320,073 A | 3/1982 | Bugler |
| 4,337,287 A | 6/1982 | Falkenberg |
| 4,343,355 A | 8/1982 | Goloff et al. |
| 4,344,899 A | 8/1982 | Monjoie |
| 4,361,426 A | 11/1982 | Carter et al. |
| 4,363,222 A | 12/1982 | Cain |
| 4,374,542 A | 2/1983 | Bradley |
| 4,396,058 A | 8/1983 | Kurschner et al. |
| 4,409,274 A | 10/1983 | Chaplin et al. |
| 4,423,772 A | 1/1984 | Dahlgren |
| 4,472,473 A | 9/1984 | Davis et al. |
| 4,501,318 A | 2/1985 | Hebrank |
| 4,512,389 A | 4/1985 | Goetschius |
| 4,518,544 A | 5/1985 | Carter et al. |
| 4,553,458 A | 11/1985 | Schoonover |
| 4,605,996 A | 8/1986 | Payne |
| 4,633,936 A | 1/1987 | Nilsson |
| 4,668,443 A | 5/1987 | Rye |
| 4,676,934 A | 6/1987 | Seah |
| 4,689,261 A | 8/1987 | Ahnstrom |
| 4,744,410 A | 5/1988 | Groves |
| 4,750,553 A | 6/1988 | Pohl et al. |
| 4,769,968 A | 9/1988 | Davis et al. |
| 4,791,773 A | 12/1988 | Taylor |
| 4,842,920 A | 6/1989 | Banai et al. |
| 4,847,019 A | 7/1989 | McNab |
| 4,857,370 A | 8/1989 | Overbergh et al. |
| 4,858,684 A | 8/1989 | Brucher et al. |
| 4,862,666 A | 9/1989 | Kero |
| 4,876,134 A | 10/1989 | Saitoh et al. |
| 4,906,510 A | 3/1990 | Todor, Jr. et al. |
| 4,915,165 A | 4/1990 | Dahlgren et al. |
| 4,930,569 A | 6/1990 | Harder |
| 4,950,430 A | 8/1990 | Chen et al. |
| 4,953,629 A | 9/1990 | Karlsson et al. |
| 4,974,656 A | 12/1990 | Judkins |
| 4,981,732 A | 1/1991 | Hoberman |
| 5,085,268 A | 3/1992 | Nilsson |
| 5,101,892 A | 4/1992 | Takeuchi et al. |
| 5,150,596 A | 9/1992 | Hunt et al. |
| 5,308,677 A | 5/1994 | Renna |
| 5,314,006 A | 5/1994 | Kaastra et al. |
| 5,314,738 A | 5/1994 | Ichikawa |
| 5,333,482 A | 8/1994 | Dunlap et al. |
| 5,380,579 A | 1/1995 | Bianchi |
| 5,413,741 A | 5/1995 | Buchholz et al. |
| 5,413,872 A | 5/1995 | Faigle |
| 5,441,793 A | 8/1995 | Siiess |
| 5,489,463 A | 2/1996 | Paulson |
| 5,544,703 A | 8/1996 | Joel et al. |
| H001621 H | 12/1996 | Ray |
| 5,598,930 A | 2/1997 | Leone et al. |
| 5,600,928 A | 2/1997 | Hess et al. |
| 5,605,655 A | 2/1997 | Ishihara et al. |
| 5,609,942 A | 3/1997 | Ray |
| 5,647,741 A | 7/1997 | Bunya et al. |
| 5,667,875 A | 9/1997 | Usui |
| 5,747,140 A | 5/1998 | Heerklotz |
| 5,792,539 A | 8/1998 | Hunter |
| 5,836,379 A * | 11/1998 | Counterman ......... F28D 19/044 165/10 |
| 5,979,050 A | 11/1999 | Counterman et al. |
| 5,983,985 A | 11/1999 | Counterman et al. |
| 6,212,907 B1 | 4/2001 | Billingham et al. |
| 6,251,499 B1 | 6/2001 | Lehman et al. |
| 6,280,824 B1 | 8/2001 | Insley et al. |
| 6,280,856 B1 | 8/2001 | Anderson et al. |
| 6,478,290 B1 | 11/2002 | Ender et al. |
| 6,497,130 B2 | 12/2002 | Nilsson |
| 6,516,871 B1 | 2/2003 | Brown et al. |
| 6,544,628 B1 | 4/2003 | Aull et al. |
| 6,660,402 B2 | 12/2003 | Tanabe |
| 6,730,008 B1 | 5/2004 | Liang |
| 6,764,532 B1 | 7/2004 | Cheng |
| 7,044,206 B2 | 5/2006 | Sabin et al. |
| 7,117,928 B2 | 10/2006 | Chen |
| 7,347,351 B2 | 5/2008 | Slattery |
| 7,555,891 B2 | 7/2009 | Muller et al. |
| 7,654,067 B2 | 2/2010 | Wattron |
| 7,938,627 B2 | 5/2011 | Muller |
| 8,296,946 B2 | 10/2012 | Wieres et al. |
| 8,323,778 B2 | 12/2012 | Webb et al. |
| 9,200,853 B2 | 1/2015 | O'Boyle et al. |
| 2002/0043362 A1 | 4/2002 | Wilson |
| 2003/0024697 A1 | 2/2003 | Matsuzaki |
| 2005/0274012 A1 | 12/2005 | Hodgson et al. |
| 2007/0017664 A1 | 1/2007 | Beamer et al. |

(56) References Cited

U.S. PATENT DOCUMENTS

| | | |
|---|---|---|
| 2009/0065185 A1 | 3/2009 | Jekerle |
| 2010/0218927 A1* | 9/2010 | Cooper ............... F28D 19/042 165/185 |
| 2010/0258284 A1 | 10/2010 | Krantz |
| 2011/0042035 A1 | 2/2011 | Seebald |
| 2012/0305217 A1 | 12/2012 | Cowburn et al. |
| 2013/0327513 A1 | 12/2013 | Franz et al. |
| 2014/0054003 A1 | 2/2014 | O'Boyle et al. |
| 2014/0090822 A1 | 4/2014 | Seeblad |
| 2015/0144293 A1 | 5/2015 | Seebald |

FOREIGN PATENT DOCUMENTS

| | | |
|---|---|---|
| CN | 101210780 A | 7/2008 |
| EP | 0150913 A2 | 8/1985 |
| EP | 0805331 A2 | 11/1997 |
| EP | 0945195 A2 | 9/1999 |
| EP | 1154143 A1 | 11/2001 |
| EP | 1884732 A2 | 2/2008 |
| EP | 2427712 | 11/2010 |
| EP | 2700893 A1 | 2/2014 |
| FR | 775271 A | 12/1934 |
| FR | 1219505 A | 5/1960 |
| GB | 177780 | 2/1923 |
| GB | 1339542 | 12/1973 |
| GB | 1567239 | 5/1980 |
| JP | 83112 | 9/1929 |
| JP | 26-006787 | 10/1951 |
| JP | S52-000746 A | 1/1977 |
| JP | S54-085547 U | 6/1979 |
| JP | S56-075590 U | 6/1981 |
| JP | S57-154874 U | 9/1982 |
| JP | 93590 | 6/1987 |
| JP | 158996 | 7/1987 |
| JP | 08-101000 A | 4/1996 |
| JP | 09-280764 A | 10/1997 |
| JP | 10-328861 A | 12/1998 |
| JP | 11-294986 A | 10/1999 |
| JP | 2001-516866 A | 10/2001 |
| JP | 2004-093036 A | 3/2004 |
| KR | 100417321 B1 | 2/2004 |
| KR | 1020080063271 | 1/2013 |
| WO | 98/14742 A1 | 4/1998 |
| WO | 98/22768 A1 | 5/1998 |
| WO | 99014543 | 3/1999 |
| WO | 00/49357 A1 | 8/2000 |
| WO | 2007012874 A1 | 2/2007 |
| WO | 2010129092 A1 | 11/2010 |
| WO | 2012000767 A2 | 1/2012 |

OTHER PUBLICATIONS

International Search Report for corresponding PCT/US2016/056209 dated May 22, 2017.

* cited by examiner

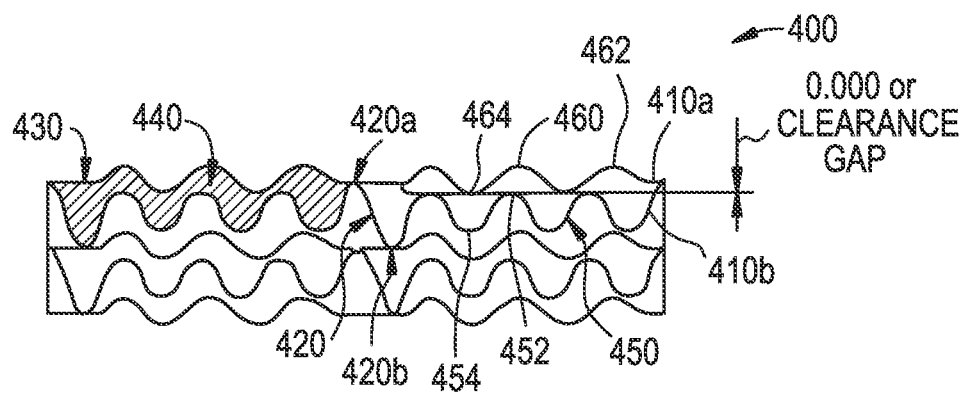
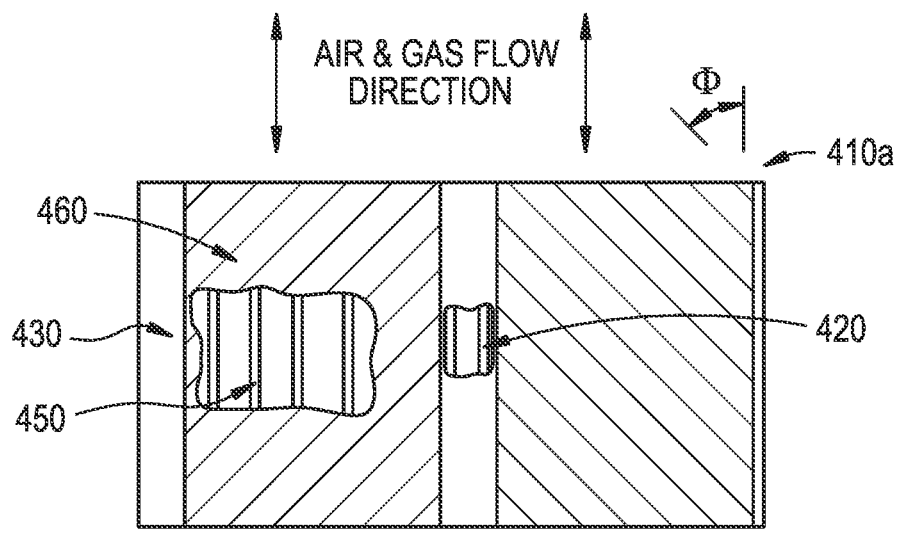

HEAT TRANSFER ASSEMBLY FOR ROTARY REGENERATIVE PREHEATER

CROSS REFERENCE TO RELATED APPLICATIONS

This application is a continuation of co-pending U.S. patent application Ser. No. 14/922,592, entitled "Heat Transfer Assembly for Rotary Regenerative Preheater," filed on Oct. 26, 2015, which is a divisional application of U.S. patent application Ser. No. 13/593,054, filed on Aug. 23, 2012, now issued as U.S. Pat. No. 9,200,853. The contents of the aforementioned patent applications are incorporated herein by reference in their entireties and the benefits of both applications are fully claimed herein.

FIELD OF THE DISCLOSURE

The present disclosure relates to rotary regenerative air preheaters for transfer of heat from a flue gas stream to a combustion air stream, and, more particularly, relates to heat transfer elements and assembly configured thereby, for a rotary regenerative air preheater.

BACKGROUND OF THE DISCLOSURE

More often than not, rotary regenerative air preheaters are used to transfer heat from a flue gas stream exiting a furnace, to a combustion air stream incoming therein. Conventional rotary regenerative air preheaters (hereinafter referred to as 'preheater(s)') includes a rotor rotatably mounted in a housing thereof. The rotor contains a heat transfer or absorbent assembly (hereinafter referred to as 'heat transfer assembly) configured by stacking various heat transfer or absorbent elements (hereinafter referred to as 'heat transfer elements') for absorbing heat from the flue gas stream, and transferring this heat to the combustion air stream. The rotor includes radial partitions or diaphragms defining compartments there between for supporting the heat transfer assembly. Further, sector plates are provided that extend across the upper and lower faces of the rotor to divide the preheater into a gas sector and one or more air sectors. The hot flue gas stream is directed through the gas sector of the preheater and transfers the heat to the heat transfer assembly within the continuously rotating rotor. The heat transfer assembly is then rotated to the air sector(s) of the preheater. The combustion air stream directed over the heat transfer assembly is thereby heated. In other forms of regenerative preheaters, the heat transfer assembly is stationary and the air and gas inlet and outlet hoods are rotated.

The heat transfer assembly must meet various important requirements, such as the transfer of the required quantity of heat for a given depth of the heat transfer assembly. Additionally, there may be a requirement for low susceptibility of the heat transfer assembly to significant fouling, and furthermore easy cleaning of the heat transfer assembly when fouled, to protect the heat transfer elements from corrosion. Other requirements may include surviving of the heat transfer assembly from wear associated with soot or ashes present in the flue gas stream and blowing there through, etc.

The preheaters, typically, employ multiple layers of different types of the heat transfer elements within the rotor. The rotor includes a cold end layer positioned at the flue gas stream outlet, and can also include intermediate layers and a hot end layer positioned at the flue gas stream inlet. Typically, the hot end and intermediate layers employ highly effective heat transfer elements which are designed to provide the greatest relative energy recovery for a given depth of the heat transfer assembly. These layers of the heat transfer assembly conventionally include heat transfer elements with open flow channels that are fluidically connected to each other. While these open channel heat transfer elements provide the highest heat transfer for a given layer depth, they allow the soot blower cleaning jets to spread or diverge as they enter the heat transfer elements. Such divergence of the soot blower jets greatly reduces cleaning efficiency of the heat transfer assembly and the heat transfer elements. The most significant amounts of fouling typically occur in the cold end layer due at least in part to condensation of certain flue gas vapors. Therefore, in order to provide heat transfer elements that allow effective and efficient cleaning by soot blower jets, the cold layer heat transfer assembly is configured from closed channel elements. The closed channels typically are straight and only open at the ends of the channels. The closed channels form separate individual conduits for the passage of flows, with very limited potential for the mixing or transfer of flows with adjacent channels.

The closed channels configured by the combination of heat transfer elements in the conventional preheaters, however, may have low heat transfer effectiveness because some of the heat transfer elements may not have appropriate surface enhancement. Other closed channels configured by the combinations of heat transfer elements may have better heat transfer effectiveness, but due to sheets being tightly packed, may not allow the passing of the larger soot or ash particles. Further, if the dimensions of such heat transfer elements were altered for loosening the heat transfer assembly to allow the large soot or ashes to pass therefrom, the heat transfer elements may not be protected with a corrosion resistant coating, since the looseness allows the impinging soot blower jets to induce vigorous vibrations and collisions between elements that damage the corrosion resistant coating.

Accordingly, there exists a need for heat transfer elements and assemblies that may effectively configure closed channel elements to preclude problems of the conventional preheaters in relation to overall heat transfer effectiveness and specifically in cold end surface, soot blowing effectiveness, passing of large soot or ash particles, cleaning of the heat transfer elements and avoiding corrosions thereof.

SUMMARY OF THE DISCLOSURE

In view of the forgoing disadvantages inherent in the prior-art, the present disclosure provides heat transfer elements and heat transfer assemblies for a rotary regenerative preheater. Such heat transfer assemblies are configured to include all advantages of the prior art, and to overcome the drawbacks inherent in the prior art and provide some additional advantages.

An objective of the present disclosure is to provide heat transfer elements having improved heat transfer capacity.

Another objective of the present disclosure is to provide heat transfer elements and assemblies thereof having improved heat transfer effectiveness when configured in cold layer assemblies.

Still another objective of the present disclosure is to provide heat transfer elements and assemblies thereof for allowing improved soot blowing.

A still further objective of the present disclosure is to provide heat transfer elements and assemblies thereof that may be capable for allowing the passing of large soot or ash particles therefrom without having to loosen the heat transfer assembly.

Yet another objective of the present disclosure is to provide heat transfer elements and assemblies thereof, which may be capable of being protected from corrosion caused by condensables present in the flue gas stream.

To achieve the above objectives, in an aspect of the present disclosure, a heat transfer assembly for a rotary regenerative preheater is provided. The heat transfer assembly, comprising, a plurality of heat transfer elements stacked in spaced relationship to each other in a manner such that each notch from a plurality of notches on one of the heat transfer elements rests on respective flat sections from a plurality of flat sections on the adjacent heat transfer elements to configure a plurality of closed channels, each isolated from the other, wherein each of the channels is configured in a manner such that each of the corrugation sections from a plurality of corrugation sections on one of the heat transfer elements faces the respective undulation sections from a plurality of undulation sections on the adjacent heat transfer elements, and wherein each of the notches has adjacent double ridges extending transversely from opposite sides of each of the heat transfer elements to configure the spaced relationship between each of the plurality of heat transfer elements.

In an embodiment of the above aspect of the present disclosure, each of the plurality of heat transfer elements comprises the plurality of undulation sections, the plurality of corrugation sections, the plurality of flat sections, and the plurality of notches, which are configured heat transfer elements across the width thereof, and located adjacent to one another.

In a further embodiment of the above aspect of the present disclosure, each of the plurality of heat transfer elements is configured to include the plurality of undulation sections, the plurality of corrugation sections, the plurality of flat sections, and the plurality of notches in a manner such that each of the flat sections and notches are spaced apart from each other by at least one of the undulation sections and corrugation sections.

In a further embodiment of the above aspect of the present disclosure, the plurality of heat transfer elements comprises, a plurality of first heat transfer elements, each of the first heat transfer elements comprising the plurality of undulation sections and the plurality of flat sections, each of the undulation sections and the flat sections are configured in alternate manner across width of each of the first heat transfer elements, and a plurality of second heat transfer elements, each of the second heat transfer elements comprising the plurality of corrugation sections and the plurality of notches, each of the corrugation sections and the notches are configured in alternate manner across width of each of the second heat transfer elements.

In a further embodiment of the above aspect of the present disclosure, the plurality of heat transfer elements comprises, a plurality of first heat transfer elements, each of the first heat transfer elements comprising the plurality of corrugation sections and the plurality of flat sections, each of the corrugation sections and the flat sections are configured in alternate manner across width of each of the first heat transfer elements, and a plurality of second heat transfer elements, each of the second heat transfer elements comprising the plurality of undulation sections and the plurality of notches, each of the undulation sections and the notches are configured in alternate manner across width of each of the second heat transfer elements.

In a further embodiment of the above aspect of the present disclosure, the undulation sections are configured at an angle to at least one of the flat section sections and the notches, and the corrugation sections are configured parallel to at least one of the flat section sections and the notches.

In yet another aspect of the present disclosure, a heat transfer assembly for a rotary regenerative preheater is provided. The heat transfer assembly comprising: a plurality of first heat transfer elements, each of the first heat transfer elements comprising, a plurality of undulation sections and a plurality of flat sections, each of the undulation sections and the flat sections are configured in alternate manner across width of the first heat transfer elements; and a plurality of second heat transfer elements, each of the second heat transfer elements comprising, a plurality of corrugation sections and a plurality of notches, with each of the notches having adjacent double ridges extending transversely from opposite sides of each of the second heat transfer elements, wherein each of the corrugation sections and the notches are configured in alternate manner across width of the second heat transfer elements, and wherein each of the first and second heat transfer elements are stacked in a spaced and alternate manner to other such that each of the notches of the second heat transfer element rests on the respective flat sections of the adjacent first heat transfer element to configure a plurality of closed channels, each isolated from the other, wherein each of the channels is configured in a manner such that each of the corrugation sections of the second heat transfer elements faces the respective undulation sections of the adjacent first heat transfer elements.

A heat transfer assembly for a rotary regenerative preheater, the heat transfer assembly comprising: a plurality of first heat transfer elements, each of the first heat transfer elements comprising, a plurality of corrugation sections and a plurality of flat sections, each of the corrugation sections and the flat sections are configured in alternate manner across width of the first heat transfer elements; and a plurality of second heat transfer elements, each of the second heat transfer elements comprising a plurality of undulation sections and a plurality of notches, each notches having adjacent double ridges extending transversely from opposite sides of each of the second heat transfer elements, wherein each of the undulation sections and the notches are configured in alternate manner across width of the second heat transfer elements, and wherein each of the first and second heat transfer elements are stacked in spaced and alternate manner to other such that each of the notches of the second heat transfer element rests on the respective flat sections of the adjacent first heat transfer elements to configure a plurality of closed channels, each isolated from the other, wherein each of the channels is configured in a manner such that each of the corrugation sections of the first heat transfer elements faces the respective undulation sections of the adjacent second heat transfer elements.

In another aspect of the present disclosure, a heat transfer assembly for a rotary regenerative preheater is provided. The heat transfer assembly comprising, a plurality of heat transfer elements, each of the plurality of heat transfer elements comprising: a plurality of undulation sections, a plurality of corrugation sections, a plurality of flat sections, and a plurality of notches, configured thereon across the width thereof and adjacent to one other, wherein each of the notches has adjacent double ridges extending transversely from opposite sides of each of the heat transfer elements, wherein the plurality of heat transfer elements is stacked in a spaced relationship to each other in a manner such that each of the notches of one of the heat transfer element rests on the respective flat sections of the adjacent heat transfer elements to configure a plurality of closed channels, each isolated from the other, wherein each of the channels is configured in a manner such that each of corrugation sections on one of the heat transfer element faces the respective undulation sections of the adjacent heat transfer elements.

In yet another aspect of the present disclosure, a heat transfer element for a heat transfer assembly of a rotary regenerative preheater is provided. The heat transfer element comprising: a plurality of undulation sections, a plurality of corrugation sections, a plurality of flat sections, and a plurality of notches, configured across the width of the heat transfer element and adjacent to one another, wherein each of the notches has adjacent double ridges extending transversely from opposite sides of the heat transfer element.

In an embodiment of the above two aspects of the present disclosure, the heat transfer element is configured to include the plurality of undulation sections, the plurality of corrugation sections, the plurality of flat sections, and the plurality of notches in a manner such that each of flat sections and notches are spaced apart from each other by at least one of the undulation sections and the corrugation sections.

In yet another aspect of the present disclosure, a method for making a heat transfer element for a heat transfer assembly of a rotary regenerative preheater is provided. The method comprising: configuring a plurality of undulation sections, a plurality of corrugation sections, a plurality of flat sections, and a plurality of notches having adjacent double ridges extending transversely from opposite sides of the heat transfer element, across the width of the heat transfer element and adjacent to one another.

In all various aspects of the present disclosure mentioned above, the undulation sections are configured at an angle to at least one of the flat section sections and the notches, and the corrugation sections are configured parallel to at least one of the flat section sections and the notches.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified objectives attained by its uses, reference should be made to the accompanying drawings and descriptive material in which there are illustrated exemplary embodiments of the present disclosure.

BRIEF DESCRIPTION OF THE DRAWINGS OF THE DISCLOSURE

Figure 2A:
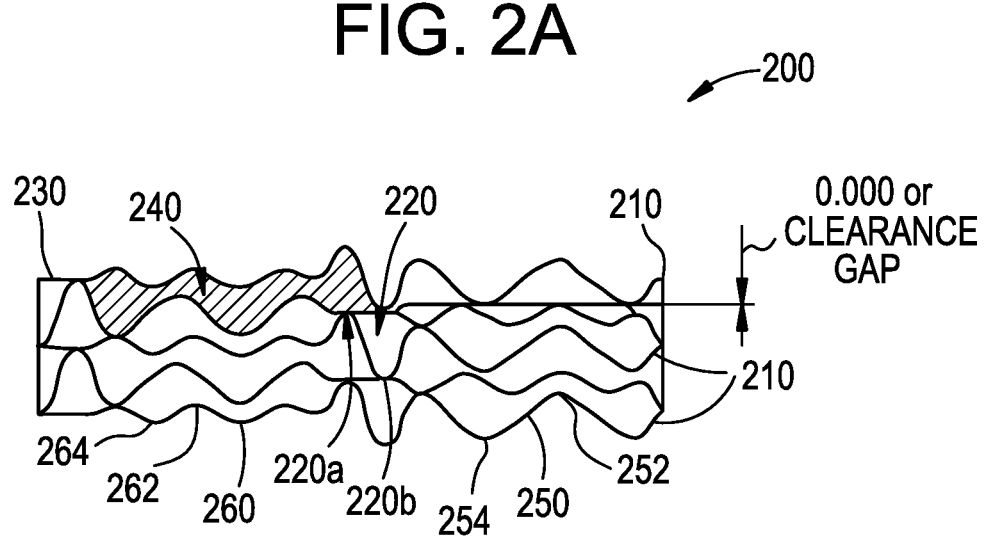
Figure 2B:
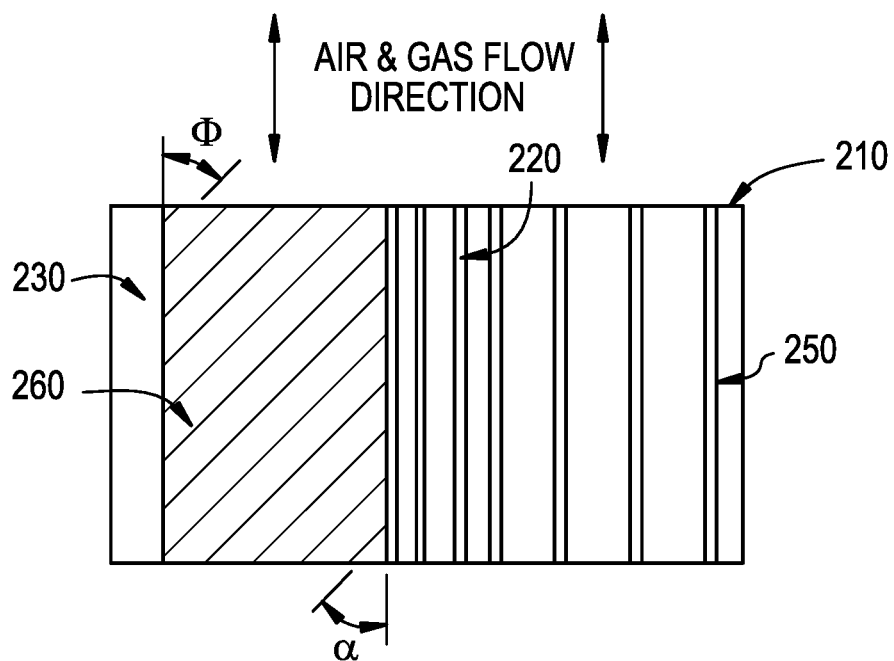
Figure 3A:
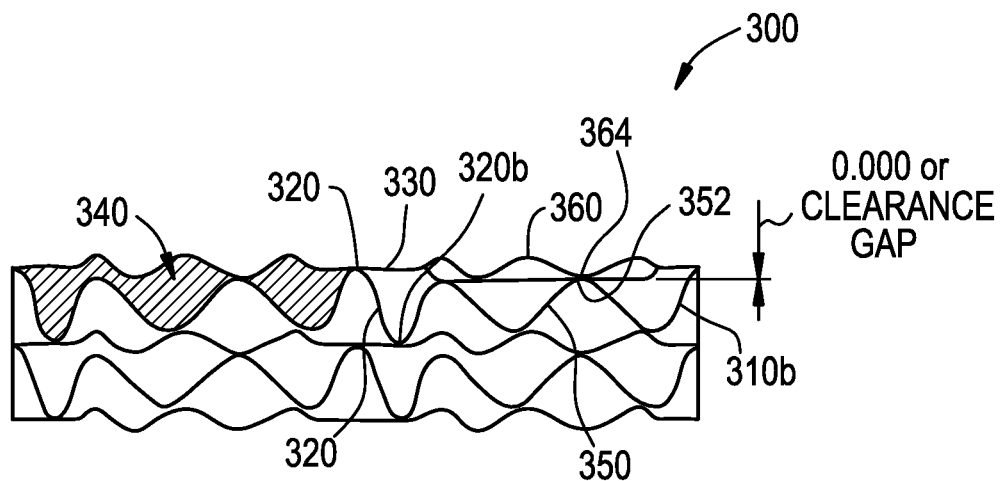
Figure 3B:
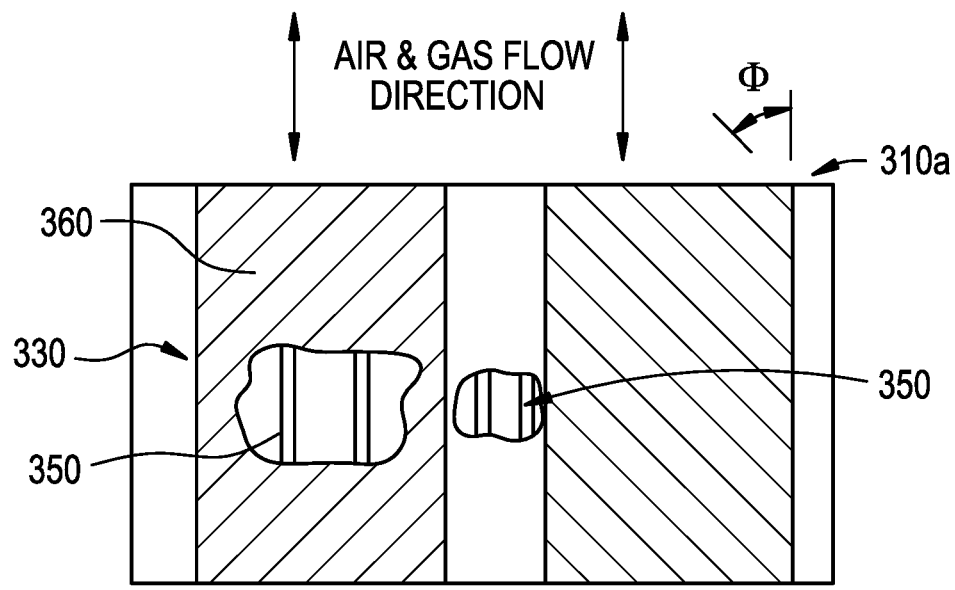
Figure 5A:
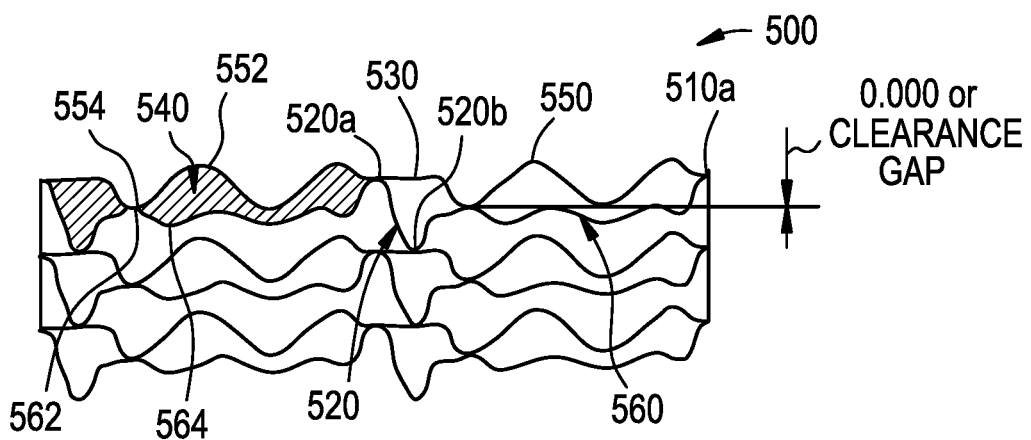
Figure 5B:
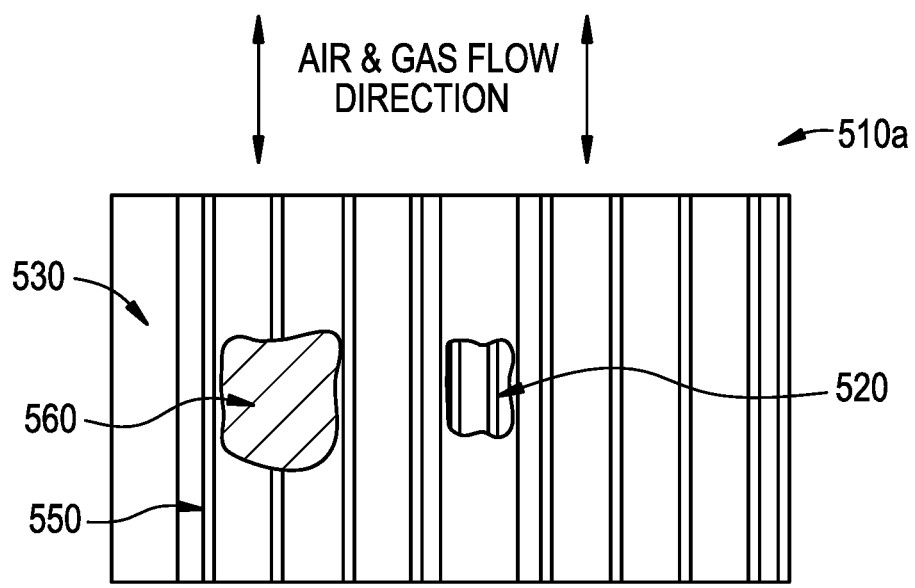

The advantages and features of the present disclosure will become better understood with reference to the following detailed description and claims taken in conjunction with the accompanying drawing, wherein like elements are identified with like symbols, and in which:

FIG. 1 illustrates a perspective view of a rotary regenerative preheater whereby various heat transfer assemblies, in accordance with various and exemplary embodiments of the present disclosure are employed;

FIGS. 2A and 2B, respectively, illustrate side and top views of a heat transfer assembly, in accordance with an exemplary embodiment of the present disclosure;

FIGS. 3A and 3B, respectively, illustrate side and top views of a heat transfer assembly, in accordance with another exemplary embodiment of the present disclosure;

FIGS. 4A and 4B, respectively, illustrate side and top views of a heat transfer assembly, in accordance with yet another exemplary embodiment of the present disclosure; and FIGS. 5A and 5B, respectively, illustrate side and top views of a heat transfer assembly, in accordance with another exemplary embodiment of the present disclosure.

Like reference numerals refer to like parts throughout the description of several views of the drawings.

DETAILED DESCRIPTION OF THE PRESENT DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The term "first," "second" and the like, herein do not denote any order, elevation or importance, but rather are used to distinguish one element over another. Further, the terms "a," "an," and "plurality" herein do not denote a limitation of quantity, but rather denote the presence of at least one of the referenced item.

Referring to FIG. 1, a perspective view of a rotary regenerative preheater 100 (hereinafter referred to as 'preheater 100') is illustrated whereby at least one of various heat transfer assemblies 200, 300, 400 and 500 as shown in FIGS. 2A to 5B, in accordance with various exemplary embodiments of the present disclosure, may be employed, and will be explained in conjunction with the respective figures in detail.

The preheater 100 includes a rotor assembly 102 rotatably mounted within a housing 104 to rotate along a rotor post 106. The rotor assembly 102 is configured to include diaphragms or partitions 108 extending radially from the rotor post 106 to an outer periphery of the rotor assembly 102. Further, the partitions 108 define various compartments 110 for accommodating various heat transfer assemblies 200, 300, 400 or 500. The housing 104 includes a flue gas inlet duct 112 and a flue gas outlet duct 114 for the flow of heated flue gases through the preheater 100. The housing 104 further includes an air inlet duct 116 and an air outlet duct 118 for the flow of combustion air through the preheater 100. Further the preheater 100 include sector plates 120 extending across the housing 104 adjacent to lower and upper faces of the rotor assembly 102, thereby dividing the preheater 100 into an air sector 122 and a gas sector 124. An arrow 'A' indicates the direction of a flue gas stream 126 through the rotor assembly 102. The hot flue gas stream 126 entering through the flue gas inlet duct 112 transfers heat to the heat transfer assemblies 200, 300, 400 or 500 mounted in the compartments 110. The heated heat transfer assemblies 200, 300, 400 or 500 are then rotated to the air sector 122 of the preheater 100. The stored heat of the heat transfer assemblies 200, 300, 400 or 500 is then transferred to a combustion air stream 128, as indicated by the arrow 'B,' entering through the air inlet duct 116. In this explanatory paragraph, it is understood that the heat of the hot flue gas stream 126 entering into preheater 100 is utilized for heating the heat transfer assemblies 200, 300, 400 or 500, which in turn heats the combustion air stream 128 entering the preheater 100 for predetermined purpose.

The heat transfer assemblies 200, 300, 400, 500 will now be explained in conjunctions with FIGS. 1 to 5B. The heat transfer assemblies 200, 300, 400 or 500 includes a plurality of heat transfer elements 210; 310a, 310b; 410a, 410b; 510a, 510b; stacked in spaced relationship to each other in a manner such that each notches 220, 320, 420, 520 of a plurality of notches 220, 320, 420, 520 of one of the heat transfer element 210; 310a, 310b; 410a, 410b; 510a, 510b; rests on respective flat sections 230, 330, 430, 530 of a plurality of flat sections 230, 330, 430, 530 of the adjacent heat transfer elements 210; 310a, 310b; 410a, 410b; 510a, 510b; to configure a plurality of channels 240, 340, 440, 540, each isolated from the other. Further, each of the channels 240, 340, 440, 540 includes configuration in a manner such that each corrugation sections 250, 350, 450, 550 of a plurality of corrugation sections 250, 350, 450, 550 of one of the heat transfer element 210; 310a, 310b; 410a, 410b; 510a, 510b; faces respective undulation sections 260, 360, 460, 560 of a plurality of undulation sections 260, 360,460, 560 of the adjacent heat transfer elements 210; 310a, 310b; 410a, 410b; 510a, 510b. Further, each notches 220, 320, 420, 520 having adjacent double ridges 220a, 220b; 320a, 320b; 420a, 420b; 520a, 520b, extending transversely from opposite sides of each of the heat transfer elements 210; 310a, 310b; 410a, 410b; 510a, 520b; for configuring the spaced relationship while stacking the heat transfer elements 210; 310a, 310b; 410a, 410b; 510a, 520b; to configure the heat transfer assemblies 200, 300 400 and 500. Further, each corrugation in the corrugation sections 250, 350, 450, 550 has a corrugation crest 252, 352, 452, 552 and a corrugation trough 254, 354, 454, 554 and each undulation in the undulation section 260, 360, 460, 560 has an undulation crest 262, 362, 462, 562 and an undulation trough 264, 364, 464, 564. For the purpose of thorough understanding of the disclosure, each of the heat transfer assemblies 200, 300, 400 and 500 will be explained in conjunction with their respective figure herein.

The heat transfer elements 210; 310a, 310b; 410a, 410b; 510a, 520b; as mentioned are obtained by metallic sheets or plates of predetermined dimensions such as length, widths and thickness as utilized and suitable for making the preheater 100 that meets the required demands of the industrial plants in which it is to be installed. The heat transfer elements 210; 310a, 310b; 410a, 410b; 510a, 510b; including various configurations will be explained in conjunctions with the particular embodiments herein.

Referring now to FIGS. 2A and 2B, which respectively, illustrate side and top views of the heat transfer assembly 200, in accordance with an exemplary embodiment of the present disclosure. The heat transfer assembly 200 includes the plurality of heat transfer elements, such as the heat transfer elements 210. Each the heat transfer elements 210 includes a plurality of notches, such as the notches 220; a plurality of flat sections, such as the flat sections 230; a plurality of corrugation sections, such as the corrugation section 250; and a plurality of undulation sections, such as the undulation sections 260, (hereinafter also may collectively or individually referred to as 'characteristics 220, 230, 250, and 260'). Further, each notch 220 includes adjacent double ridges 220a and 220b extending transversely from opposite sides of each of the heat transfer elements 210. All the mentioned four characteristics may be configured on each of the heat transfer elements 210 across the width thereof and adjacent to one another. In the present embodiment as mentioned above, all the characteristics 220, 230, 250, and 260 are configured on one heat transfer element 210. However, such characteristics 220, 230, 250, and 260, in combination of two, may be configured on more than one heat transfer elements and will be explained in conjunction with FIGS. 3A to 5B. Further, FIGS. 2A to 5B depicting various kind of the heat transfer assemblies 200, 300, 400 and 500 are actually depicting a portion of such assemblies and may not be considered to be limiting as shown. Any such assemblies are formed by repeatedly applying characteristics 220, 230, 250, and 260.

In one embodiment of the present disclosure, the notches 220 and the flat sections 230 are spaced apart, from at least one of the corrugation sections 250 and the undulation sections 260 on each of the heat transfer elements 210. In an exemplary embodiment, as shown in FIGS. 2A and 2B, the characteristics 220, 230, 250, and 260 are configured in the following order, such as the flat section 230, the undulation section 260, the notches 220 and the corrugation sections 250. However, without departing from the scope of the present disclosure the characteristics 220, 230, 250, and 260 may be configured in any order to obtain the channels 240, depending upon the industrial requirements. According to this embodiment of the present disclosure, all mentioned characteristics 220, 230, 250, and 260 are configured on each of the single heat transfer elements 210, in its most likely form, by single roll manufacturing process, utilizing a single set of rollers. Subsequent to configuring the characteristics 220, 230, 250, and 260, each such heat transfer elements or sheets 210 may be coated with a suitable coating, such as porcelain enamel, which makes the heat transfer elements or sheets 210 slight thicker and also prevent the metallic sheet substrates from directly being in contact with the flue gas, thereby preventing corrosion from the effects of soot, ashes or condensable vapors within that stream.

The characteristics 220, 230, 250, and 260 are configured on each of the heat transfer elements 210 in a specific manner. In one embodiment, each undulation of the undulation sections 260 is configured at an angle to at least one of the flat sections 230 and the notches 220. For example, as shown in FIG. 2B, the undulations 260 are configured at an angle 'Φ' with respect to the flat section 230, or may be configured at an angle 'α' with respect to the notches 220. In one scope, the angles 'Φ' and 'α' may be of same degrees, and in another scope said angles may be different, depending upon the requirements. Further, the characteristics such as the corrugation sections 250 are also configured in a particular manner with respect to the at least one of the notches 220 and the flat sections 230. In one embodiment as shown in FIG. 2B, the corrugation sections 250 are configured parallel to at least one of the notches 220 and the flat sections 230. From the above writer descriptions about the characteristics 220, 230, 250, and 260, it may be clearly evident that the undulations or undulation sections 260 extend angularly with respect to the notches 220 or the flat sections 230, and that the corrugations or the corrugation sections 250 are configured parallel with respect to the notches 220 or the flat sections 230. The terms such as 'corrugations' or 'corrugation sections;' 'flats' or 'flat sections;' and 'undulations' or 'undulation sections' are alternatively and interchangeably used throughout the description and may be considered as same.

For configuring the channels 240 according to the present embodiment as mentioned above, various heat transfer elements 210 are stacked in spaced relationship to each other. The stacking thereof are in such a manner that each of the notches 220 of one of the heat transfer element 210 rests on the flats 230 of the adjacent heat transfer element 210. For example, as shown in FIG. 2A, the notch 220 of the top heat transfer element 210 rests on the flat 230 of the adjacent lower heat transfer element 210, similarly, the notch 220 of the lower heat transfer element 210 rests on the flat 230 of the adjacent top heat transfer element 210, thereby configuring the channel 240. Similarly, various channels 240 are configured across the heat transfer elements 210 when various such heat transfer elements 210 are stacked together. The stacking of the heat transfer elements 210 may be tight enough to avoid looseness and still allow the substantially larger size soot or ash particles to pass therefrom.

The channels 240, as formed, include a particular configuration to achieve above objectives, in accordance with the various embodiments of the present disclosure. The channels 240 are isolated from one another due to the contact between the notches 220 and the flats 230, (hereinafter may also be selectively referred to as the 'closed channels 240'), and may be generally straight and opened across the ends thereof. The closed channels 240 encourage the flow of the fluids, such as those from impinging soot blower jets, to pass straightly through without spreading or diverging across the width of the heat transfer elements 210. Further, while stacking various heat transfer elements 210, a suitable spacing are achieved between the two consecutive heat transfer elements 210 due to the presence of the notches 220, and more particularly, due to the ridges 220a and 220b that rests on the respective flats 230 of the adjacent heat transfer elements 220. This is due to the fact that the ridges 220a and 220b of the notches 220 are configured at such measured predetermined heights that enable the required spacing between the consecutive heat transfer elements 210. Such required spacing between the two consecutive heat transfer elements 210 results in a suitable depth of the closed channels 240 to substantially allow the passing of the large soot or ash particles therefrom, which in turn prevents the plugging or blocking of the heat transfer assembly 200, and accordingly of the preheater 100. For example, the closed channels 240 of the present disclosure may be capable of passing the soot or ash particles of size up to about 9/32 inches, approximately about 7 millimeters, effectively. However, without departing from the scope of the present disclosure, the heat transfer assembly 200 may be configured to enable passing of the even larger size of the soot or ash particles.

As cited above, in a conventional heat transfer assembly mounted in some preheaters are generally loosely stacked elements for allowing the passing of larger soot or ash particles therefrom. Such loosely stacked heat transfer assemblies result in the collisions of the heat transfer elements with each other due to vigorous vibrations caused by impinging soot blower jets. The present disclosure may be capable of precluding such problems due to the notches 220 and flats 230 being in close configuration or resting on each other and still enabling to pass the large sized soot or ash particles from the closed channels due to the size of ridges 220a and 220b being sufficiently high. Specifically, as mentioned above, subsequent to making the heat transfer elements 210 with the mentioned characteristics, the heat transfer elements 210 are being coated with a suitable coating. Such coatings are prone to damage in the loosely stacked assemblies due to collision of the heat transfer elements 210 during soot blowing, which may generally not be the case with the present disclosure.

Further, each of the channels 240 configured in the heat transfer assembly 200, the alignments of the corrugations 250 and undulations 260 on the adjacent heat transfer plates 210 are in such a manner that they faces each other. In one embodiment of the present disclosure, there may be a clearance gap of substantial distance, and in another embodiment there may be clearance gap of about null, between the corrugations 250 and the adjacent undulation 260 of two consecutive heat transfer elements 210 stacked for configuring the channels 240. Such a configuration of the channels 240 is capable of increasing heat transfer effectiveness exceeding the current cold end surfaces, in overall heat transfer effectiveness of the preheater 100.

Referring now to FIGS. 3A to 4B, wherein heat transfer assemblies, such as the heat transfer assemblies 300 and 400 are illustrated in accordance with another embodiment of the present disclosure. Specifically, referring to FIGS. 3A and 3B, the heat transfer assembly 300 includes the plurality of heat transfer elements, such as the plurality of first heat transfer elements 310a and the plurality of the second heat transfer elements 310b. Each of the first heat transfer elements 310a includes a plurality of undulation sections, such as the undulation sections 360, and the plurality of flat sections, such as the flat sections 330. Each of the undulation sections 360 and the flat sections 330 are configured in alternate manner across width of each of the first heat transfer elements 310a. Each of the undulation troughs 364 extend toward the second heat transfer element 310b. Further, each of the second heat transfer elements 310b includes a plurality of corrugation sections, such as the corrugation sections 350, and the plurality of notches, such as the notches 320. Each of the corrugation sections 350 and the notches 320 are configured in alternate manner across width of each of the second heat transfer elements 310b. Each of the corrugation crests 352 extend toward the first heat transfer element 310a.

In this embodiment, as mentioned and illustrated, two characteristics out of 320, 330, 350, and 360 are configured per heat transfer elements 310a, 310b instead of one heat transfer element, such as in the heat transfer elements 210. To configure the channels, such as the channels 340, the first and second heat transfer elements 310a, 310b, are alternately stacked in such a manner that the notches 320 of the second heat transfer element 310b rest on the flat section 330 of the adjacent first heat transfer elements 310a. The channels 340 have similar configuration as of the channels 240, and the explanation thereof is excluded herein for the sake of brevity. The stacking of the plurality of first and second heat transfer elements 310a and 310b are in the spaced relationship from each other, and also in tightly packed manner as explained above, due the suitable heights of the ridges 320a and 320b of the notches 320 configured on each of the second heat transfer elements 310b.

The notches 320, flats 330, corrugations 350, and undulations 360, are configured on the respective heat transfer elements 310a and 310b in a specific manner. In one embodiment, undulations 260 are configured at an angle to the flats 330 on the first heat transfer element 310a. For example, as shown in FIG. 3B, the undulations 360 are configured at an angle 'Φ' with respect to the flats 330. Further, the corrugations 350 are also configured in a particular manner with respect to the notches 320 on the second heat transfer elements 310b. In one embodiment as shown in FIG. 3B, the corrugation sections 350 are configured parallel to the notches 320. From the above written descriptions it may be clearly evident that the undulations 360 extend angularly with respect to the flat sections 330 on the first heat transfer elements 310a, and that the corrugations 350 are configured parallely with respect to the notches 320 on the second heat transfer elements 310b.

Referring now to FIGS. 4A and 4B, the heat transfer assembly 400 is illustrated. The heat transfer assembly 400 is substantially similar to the heat transfer assembly 300. Similar to the heat transfer assembly 300, the heat transfer assembly 400 also includes the plurality of heat transfer elements, such as the plurality of first heat transfer elements 410a and the plurality of the second heat transfer elements 410b. Each of the first heat transfer elements 410a includes a plurality of undulation sections, such as the undulation sections 460, and the plurality of flat sections, such as the flat sections 430. Each of the undulation sections 460 and the flat sections 430 are configured in alternate manner across width of each of the first heat transfer elements 410a. Each of the undulation troughs 464 extend toward the second heat transfer element 410b. Further, each of the second heat transfer elements 410b includes a plurality of corrugation sections, such as the corrugation sections 450, and the plurality of notches, such as the notches 420. Each of the corrugation sections 450 and the notches 420 are configured in alternate manner across width of each of the second heat transfer elements 410b. Each of the corrugation crests 452 extend toward the first heat transfer element 410a. The fact of alteration between the heat transfer assemblies 300 and 400 may be between the configurations of the corrugations. The corrugations 450 may be more curved and circular in shape, and compact, while the corrugations 350 may be edgy and less compact. The curve and compactness of the corrugations 450 may be capable of having comparatively better efficiency over all of the heat transfer assembly 400. The channels 440 are configured by alternatively stacking the first and second heat transfer elements 410a and 410b, as in the case of the heat transfer assembly 300. The detailed explanation of the same is excluded herein for the sake of brevity. The notches 420, flats 430, corrugations 450, and undulations 460, are configured on the respective heat transfer elements 410a and 410b in a similar manner as explained above with respect to FIGS. 3A and 3B. For example, as shown in FIG. 4B, the undulations 460 are configured at an angle 'Φ' with respect to the flat section 430 on the first heat transfer element 410a. Further, the corrugation sections 450 are configured parallel to the notches 420 on the second heat transfer element 410b.

As shown in FIG. 4A, there is a gap between the corrugation section 450 and the undulation section 460. In an embodiment wherein all of the corrugations in the corrugation sections 450 have an angular or edgy shape, at least a portion of an undulation trough 464 in an undulation section 460 that is between two flat sections 430 touches at least a portion of one corrugation crest 452 in a corrugation section 450 that is in between two notches 420 such that there is no gap between the touching portions of the undulation trough 464 and the corrugation crest 452.

Referring now to FIGS. 5A and 5B, a heat transfer assembly, such as the heat transfer assembly 500 is illustrated in accordance with another embodiment of the present disclosure. The heat transfer assembly 500 includes the plurality of heat transfer elements, such as the plurality of first heat transfer elements 510a and the plurality of the second heat transfer elements 510b. Each of the first heat transfer elements 510a includes a plurality of flat sections, such as the flat sections 530, and a plurality of corrugation sections, such as the corrugation sections 550. Each of the flat sections 530 and the corrugation sections 550 are configured in alternate manner across width of each of the first heat transfer elements 510a. Each of the corrugation troughs 554 extend toward the second heat transfer element 510b. Further, each of the second heat transfer elements 510b includes a plurality of notches, such as the notches 520, and a plurality of undulation sections, such as the undulation sections 560. Each of the undulation sections 560 and the notches 520 are configured in alternate manner across width of each of the second heat transfer elements 510b. Each of the undulation crests 562 extend toward the first heat transfer element 510a. At least a portion of a corrugation trough 554 in a corrugation section 550 between two flat sections 530 touches at least a portion of an undulation crest 562 in an undulation section 560 between two notches 520 such that there is no gap between the touch portions of the corrugation rough 554 and the undulation crest 562.

In this embodiment similar to the above embodiments as depicted in FIGS. 3A to 4B, two characteristics out of 520, 530, 550, and 560 are configured per heat transfer elements 510a, 510b instead of one heat transfer element, such as the heat transfer elements 210 depicted in FIGS. 2A and 2B. To configure the channels, such as the channels 540, the first and second heat transfer elements 510a, 510b, are alternately stacked in such a manner that the notches 520 of the second heat transfer element 510b rest on the flat section 530 of the adjacent first heat transfer elements 510a. The channels 540 have the similar configuration as of the channels 240, 340, and 440, and explanation thereof is excluded herein for the sake of brevity. The stacking of the plurality of the first and second heat transfer elements 510a and 510b are in the spaced relationship from each other and also in tightly packed manner as explained above, due the suitable heights of the ridges 520a and 520b of the notches 520 configured on each second heat transfer elements 510b.

Further, the notches 520, flats 530, corrugations 550, and undulations 560, are configured on the respective heat transfer elements 510a and 510b. The corrugation sections 550 are configured in a particular manner with respect to the flats 530 on each of the first heat transfer element 510a. Specifically, the corrugation sections 550 are configured parallel to the notches 520. Further, the undulation sections 560 are configured at an angle to the notches 520 on the second heat transfer elements 510b. For example, the undulations 560 are configured at an angle 'Φ' with respect to the notches flat section 330.

Further, the configuration of the channels 340, 440 and 540 of the above embodiments are all similar to the channels 240, and includes all the advantages features as explained in conjunction to the channels 240 in the scope thereof. Similarly, the heat transfer assemblies 300, 400 and 500 also includes all advantageous features explained in the conjunction with the heat transfer assembly 200, and excluded herein for the sake of brevity. Further according to various embodiments of the present disclosure, there may be a clearance gap of substantial distance, or there may be clearance gap of about null, between the corrugations 350, 450, 550 and the adjacent undulation 360, 460, 560 of two consecutive heat transfer elements 310a and 310b; 410a and 420b; 520a and 529b, stacked for respectively configuring the channels 340, 450 and 550.

The heat transfer elements 210; 310a, 310b; 410a, 410b; 510a, 510b and the respective heat transfer assemblies 200, 300, 400 or 500, are generally described herein as per a bi-sector type air preheater. However, the disclosure extends to include configuration and stacking of the various heat transfer elements for other kinds of air preheater such as a tri-sector or quad-sector type air preheaters, and explanation thereof are excluded herein for the sake of brevity. In general, the preheater 100 may be any of the bi-sector, tri-sector or quad-sector type air preheaters and configuration or stacking of the various heat transfer elements of the disclosure may be done as per the requirements of the kind of the air preheaters.

The heat transfer elements 210; 310a, 310b; 410a, 410b; 510a, 510b and the heat transfer assemblies 200, 300, 400 or 500, respectively, configured thereby utilized in conjunction with the preheater 100 in an industrial plant offer the following advantages, apart from mentioned above. The present disclosure is advantageous in providing improved heat transfer effectiveness overall and specifically for the cold end surface of the air preheaters. Further, the heat transfer assemblies of the present disclosure are advantageous in providing improved soot blowing effectiveness. Furthermore, the heat transfer elements and assemblies thereof are tightly packed and still capable for allowing the passage of large soot or ash particles therefrom without having to loosen the heat transfer assemblies. Due to the tightly packed assemblies, which preclude collision of the heat transfer elements, the coating of porcelain enamel and the like on the heat transfer elements do not get destroyed, thereby reduces the chances of corrosions of the heat transfer elements. Moreover, the assemblies are also capable of permitting soot blower energy to penetrate through the heat transfer surface with sufficient energy to clean the heat transfer elements positioned further from the soot blowing equipment, which also cleans the coatings for corrosion protection, and to facilitate ash or soot deposit removal. Further, the closed channel feature may be suitable for applications such DeNOx application, where ammonium bisulfate deposits may form in the heat transfer assemblies. The assemblies of the present disclosure is capable of preserving soot blowing energy, thereby enabling the heat transfer elements to be effective for the use of DeNOx application. Further, the disclosed heat transfer elements 210; 310a, 310b; 410a, 410b; 510a, 510b may also be used in gas-to-gas heat exchangers that are generally used for stack gas reheat.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A heat transfer assembly for a rotary regenerative preheater, the heat transfer assembly comprising:
   a plurality of heat transfer elements, each heat transfer element having a length extending from an inlet end to an outlet end, the plurality of heat transfer elements stacked in spaced relationship to each other in a manner such that each notch from a plurality of notches from one of the heat transfer elements rests on respective flat sections from a plurality of flat sections from the adjacent heat transfer elements to configure a plurality of closed channels, each isolated from the other, wherein each of the channels has a configuration in a manner such that each corrugation section from a plurality of corrugation sections from one of the heat transfer elements faces respective undulation sections from a plurality of undulation sections from the adjacent heat transfer elements, and wherein each of the notches has adjacent double ridges extending transversely from opposite sides of each of the heat transfer elements to configure the spaced relationship between each of the plurality of heat transfer elements,
   the plurality of heat transfer elements comprising:
   (a) a plurality of first heat transfer elements, each of the first heat transfer elements comprising the plurality of undulation sections extending the length of the first heat transfer element from the inlet end to the outlet end and the plurality of flat sections extending the length of the first heat transfer element from the inlet end to the outlet end, each of the undulation sections and the flat sections configured in an alternating manner across a width of each of the first heat transfer elements, the undulation sections configured at a non-zero angle to the flat sections over the length of each of the first heat transfer elements from the inlet end to the outlet end; and
   (b) a plurality of second heat transfer elements, each of the second heat transfer elements comprising the plurality of corrugation sections extending the length of the second heat transfer element from the inlet end to the outlet end and the plurality of notches extending the length of the second heat transfer element from the inlet end to the outlet end, each of the corrugation sections and the notches configured in an alternating manner across a width of each of the second heat transfer elements, the corrugation sections configured parallel to the notches over the length of each of the second heat transfer elements from the inlet end to the outlet end,
   wherein each undulation of the undulation sections comprises an undulation crest and an undulation trough and each corrugation of the corrugation sections comprise a corrugation crest and a corrugation trough, each of the undulation troughs extends toward the second heat transfer element and each of the corrugation crests extends toward the first heat transfer element and creating a gap between the undulation section of the first heat transfer element and the corrugation section of the second heat transfer element, and
   further wherein:
   each corrugation trough comprises a curved shape, the curved shape being the same for each corrugation trough, and
   each corrugation crest comprises the curved shape, the curved shape being the same for each corrugation crest.

2. The heat transfer assembly according to claim 1, wherein each corrugation of the corrugation section has a first crest-to-trough amplitude.

3. The heat transfer assembly according to claim 2, wherein each of the first crest-to-trough amplitudes is identical.

4. The heat transfer assembly according to claim 1, wherein:
   wherein each corrugation of the corrugation section has a first crest-to-trough amplitude, each of the first crest-to-trough amplitudes are identical,
   each undulation of the undulation section has a second crest-to-trough amplitude, each of the second crest-to-trough amplitudes are identical, and the first crest-to-trough amplitude is not equal to the second crest-to-trough amplitude.

5. The heat transfer assembly according to claim 4, wherein:
at a first cross section of the heat transfer assembly, each corrugation section between two notches comprises three corrugation crests and three corrugation troughs;
at the first cross section of the heat transfer assembly, each undulation section between two flat sections comprises three undulation crests and two undulation troughs.

6. A heat transfer assembly for a rotary regenerative preheater, the heat transfer assembly comprising:
a plurality of first heat transfer elements, each having a length extending from an inlet end to an outlet end, each of the first heat transfer elements comprising a plurality of undulation sections extending the length of the first heat transfer element from the inlet end to the outlet end and a plurality of flat sections extending the length of the first heat transfer element from the inlet end to the outlet end, each of the undulation sections and the flat sections configured in an alternating manner across a width of each of the first heat transfer elements, the undulation sections being configured at a non-zero angle to the flat sections over the length of each of the first heat transfer elements from the inlet end to the outlet end, and
a plurality of second heat transfer elements, each of the second heat transfer elements comprising a plurality of corrugation sections extending the length of the second heat transfer element from the inlet end to the outlet end and a plurality of notches extending the length of the second heat transfer element from the inlet end to the outlet end, each of the notches has adjacent double ridges extending transversely from opposite sides of each of the second heat transfer elements, wherein each of the corrugation sections and the notches are configured in an alternating manner across a width of each of the second heat transfer elements, the corrugation sections configured parallel to the notches over the length of each of the second heat transfer elements from the inlet end to the outlet end;
wherein each undulation of the undulation sections comprises an undulation crest and an undulation trough and each corrugation of the corrugation sections comprises a corrugation crest and a corrugation trough, each of the undulation troughs extends toward the second heat transfer element and each of the corrugation crests extends toward the first heat transfer element and creating a gap between the undulation section of the first heat transfer element and the corrugation section of the second heat transfer element,
wherein each corrugation trough comprises a curved shape, the curved shape being the same for each corrugation trough and each corrugation crest comprises the curved shape, the curved shape being the same for each corrugation crest, and
wherein each of the first and second heat transfer elements are stacked in spaced and alternating manner to each other such that each of the notches of the second heat transfer element rests on the respective flat sections of the adjacent first heat transfer element to configure a plurality of closed channels, each isolated from the other, wherein each of the channels has a configuration in a manner such that each of corrugation sections of one of the first heat transfer elements and the second heat transfer elements faces the respective undulation sections of the other of an adjacent one of the first heat transfer elements and the second heat transfer elements.

7. The heat transfer assembly according to claim 6, wherein each corrugation of the corrugation section has a first crest-to-trough amplitude.

8. The heat transfer assembly according to claim 7, wherein each of the first crest-to-trough amplitudes is identical.

9. A heat transfer assembly for a rotary regenerative preheater, the heat transfer assembly comprising:
a plurality of heat transfer elements, each heat transfer element having a length extending from an inlet end to an outlet end, the plurality of heat transfer elements stacked in spaced relationship to each other in a manner such that each notch from a plurality of notches from one of the heat transfer elements rests on respective flat sections from a plurality of flat sections from the adjacent heat transfer elements to configure a plurality of closed channels, each isolated from the other, wherein each of the channels has a configuration in a manner such that each corrugation section from a plurality of corrugation sections from one of the heat transfer elements faces respective undulation sections from a plurality of undulation sections from the adjacent heat transfer elements, and wherein each of the notches has adjacent double ridges extending transversely from opposite sides of each of the heat transfer elements to configure the spaced relationship between each of the plurality of heat transfer elements,
the plurality of heat transfer elements comprising:
a plurality of first heat transfer elements, each of the first heat transfer elements comprising the plurality of corrugation sections extending the length of the first heat transfer element from the inlet end to the outlet end and the plurality of flat sections extending the length of the first heat transfer element from the inlet end to the outlet end, each of the corrugation sections and the flat sections configured in an alternating manner across a width of each of the first heat transfer elements, the corrugation sections configured parallel to the flat sections over the length of each the first heat transfer elements from the inlet end to the outlet end; and
a plurality of second heat transfer elements, each of the second heat transfer elements comprising the plurality of undulation sections extending the length of the second heat transfer element from the inlet end to the outlet end and the plurality of notches extending the length of the second heat transfer element from the inlet end to the outlet end, each of the notches has adjacent double ridges extending transversely from opposite sides of each of the second heat transfer elements, each of the undulation sections and the notches configured in an alternating manner across a width of each of the second heat transfer elements, the undulation sections configured at a non-zero angle to the notches over the length of each of the second heat transfer elements from the inlet end to the outlet end,
wherein each corrugation of the corrugation sections comprises a corrugation crest and a corrugation trough and each undulation of the undulation sections comprises an undulation crest and an undulation trough, each of the corrugation troughs extending toward the second heat transfer element and each of the undulation crests extending toward the first heat transfer element, and
further wherein at least a portion of a corrugation trough in a corrugation section between two flat sections touches at least a portion of an undulation crest in an undulation section between two notches such that there is no gap between the touching portions of the corrugation trough and undulation crest.

10. The heat transfer assembly according to claim 1, wherein each undulation of the undulation section has a second crest-to-trough amplitude.

11. The heat transfer assembly according to claim 10, wherein each of the second crest-to-trough amplitudes are identical.

* * * * *